United States Patent [19]
Basickes et al.

[11] Patent Number: 6,152,412
[45] Date of Patent: Nov. 28, 2000

[54] SUSPENSION HANGER

[75] Inventors: Stanley Basickes; Elliott Greenfield, both of Melrose Park, Pa.

[73] Assignee: Greenfield Mfg. Co., Inc., Philadelphia, Pa.

[21] Appl. No.: 09/061,707

[22] Filed: Apr. 17, 1998

[51] Int. Cl.[7] .................................................. A47H 1/10
[52] U.S. Cl. ..................... 248/317; 248/74.1; 248/74.3; 411/175
[58] Field of Search ................... 248/317, 74.1, 248/74.3, 58, 62; 411/175; 24/278, 279, 284

[56] References Cited

U.S. PATENT DOCUMENTS

| | | | |
|---|---|---|---|
| 2,338,659 | 1/1944 | Morehouse | 248/74.1 |
| 2,445,481 | 7/1948 | Wertz | 248/74.1 |
| 3,505,761 | 4/1970 | Prieur | 248/74.1 |
| 4,153,228 | 5/1979 | Delserro et al. | 248/74.1 |
| 4,360,177 | 11/1982 | Dulhunty | 248/58 |
| 4,378,617 | 4/1983 | Burns | 24/278 |
| 4,442,994 | 4/1984 | Logsdon | 248/74.1 |
| 4,445,255 | 5/1984 | Olejak | 248/74.1 |
| 4,533,102 | 8/1985 | Ferrell | 248/74.1 |
| 4,982,920 | 1/1991 | Hungerford | 248/71 |
| 5,010,626 | 4/1991 | Dominquez | 24/279 |
| 5,024,404 | 6/1991 | Ballard | 248/62 |
| 5,261,633 | 11/1993 | Mastro | 248/74.1 |
| 5,482,234 | 1/1996 | Lyon | 248/74.5 |

*Primary Examiner*—Anita M. King
*Assistant Examiner*—Kimberly Wood
*Attorney, Agent, or Firm*—William H. Eilberg

[57] ABSTRACT

A pipe hanger has a tubular section which is split axially so that the tubular section can be opened and fit around a pipe. Two partially overlapping tabs extend from the tubular section. When the tabs are urged together, holes in the tabs become aligned, and permit a single fastener to secure the tabs together, and to affix the hanger to a support structure. The hanger therefore requires only a single fastener. The fastener is preferably supplied with the hanger, and is held by friction in one of the holes in the tabs, or in a tubular chamber extending from one of the tabs. The shape of the tubular section facilitates manual closing of the tubular section around the pipe. The hanger is very easy to install, even when the hanger is located in an inconvenient position.

27 Claims, 9 Drawing Sheets

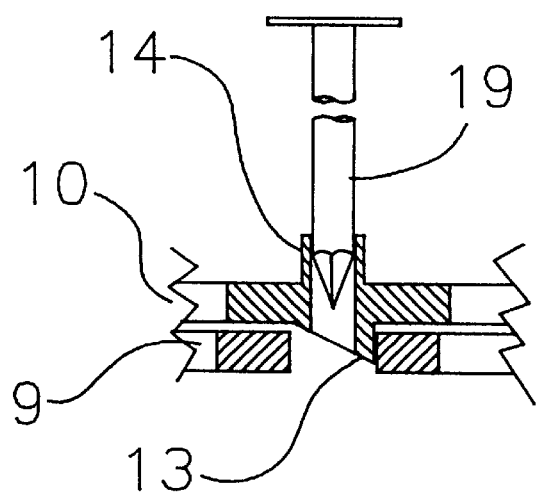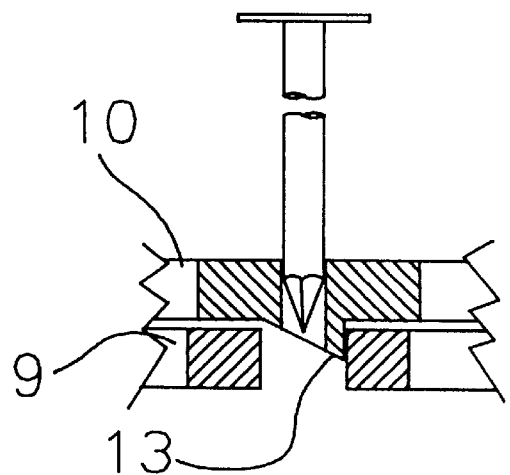
Fig. 6A  Fig. 6B
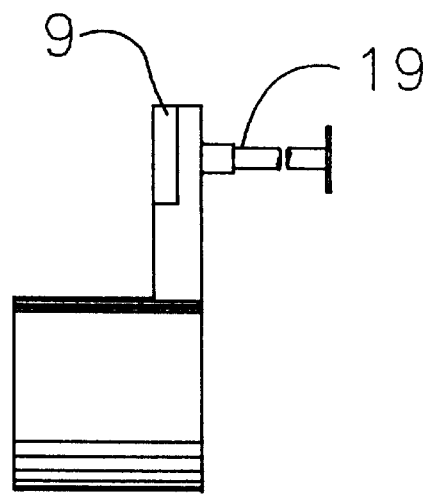
Fig. 7

SUSPENSION HANGER

BACKGROUND OF THE INVENTION

This invention relates to the field of hanging devices, and provides a hanger for supporting tubular structures such as plastic pipes, copper tubing, or other kinds of tubing.

Pipes used in plumbing and heating are often suspended from structural elements such as beams and joists, or attached to walls. Hanging devices are needed to affix the pipes to the beams, joists, walls, or other support structure. In the prior art, it has been known to use metal tube straps, wire pipe hooks, or bell hangers. FIG. 1A shows a bell hanger of the prior art. FIGS. 1B and 1C show a wire hook and a tube strap, respectively. The devices shown in FIGS. 1A–1C have historically been used with metal pipe, such as copper pipe.

Pipes used in modern plumbing are often made of plastic. As plastic piping has become more common, it has become customary to suspend such piping with straps (shown in FIG. 2A), suspension clamps (shown in FIG. 2B), and talons (shown in FIG. 2C), all made of plastic. The most popular of the hanging devices of FIGS. 2A–2C is the talon, primarily because it is sold with a pre-loaded nail. However, the talon has the disadvantage that it does not completely surround the pipe, and does not completely isolate the pipe from the adjacent support structure. Although the talon defines a circular recess which would appear to isolate the pipe from the nearby support structure, the talon usually fails, in practice, to prevent the pipe from touching the support structure, because insertion of the nail into the wall also forces the pipe against the wall. The talon is also difficult to use under beams as a suspension clamp, where nails must be driven vertically overhead. Also, the talon has a limited load carrying capacity.

The suspension clamp of FIG. 2B does isolate the pipe from the support structure. Also, the nails are driven horizontally, which makes it much easier to attach the clamp to the support structure. However, the suspension clamp has the disadvantage that it requires two nails. This disadvantage is especially problematic when an unassisted installer tries to manipulate both the pipe and the two nails while installing the clamp.

Apart from the talon, none of the prior art devices mentioned above has a pre-loaded nail. Moreover, in all cases except for the talon, it is necessary to fasten the hanger to the support structure at two distinct points, using separate nails or their equivalents.

The present invention solves the problems of the prior art, by providing a hanger which comes with a pre-loaded nail, and which requires only one such nail for installation. Despite its use of a single nail, the hanger of the present invention holds the pipe just as securely as the prior art devices which use two nails.

SUMMARY OF THE INVENTION

A pipe hanger includes a tubular section, preferably made of plastic or other flexible and resilient material, the tubular section being split axially to define two ends. The ends are connected to tabs which extend from the tubular section. The tabs have holes which come into alignment when the tabs, or the ends of the tubular section, are urged together. The tubular section preferably has a shape which facilitates gripping by the fingers, so that the ends can be squeezed together easily, even when the hanger is in an inconvenient position. A tubular projection extends from one of the tabs and provides means for locking the tabs together when the projection becomes aligned with the hole in the other tab.

An elongated fastener, such as a screw or rail, is inserted into the hole in one of the tabs. The hole has a diameter which is small enough that the fastener is securely held by friction within the hole. Alternatively, one of the tabs may be connected to a tubular chamber which extends from the tab, and which holds the fastener by friction.

In use, the tubular section is fitted around a pipe or other elongated member, by opening the ends of the tubular section, and fitting the tubular section around the pipe. The ends of the tubular section are compressed, until the tabs slide towards each other and the tubular projection engages the hole in the opposing tab. The fastener is then driven into a support structure to which the hanger is to be mounted. The fastener holds the tabs in the locked position, and thereby maintains the tubular section securely around the pipe. The fastener also affixes the hanger to the support structure.

The invention also includes the method of hanging a pipe to a support structure, as described above.

The hanger of the present invention therefore requires only a single fastener, and is very easy to use. It isolates the pipe from the support structure because the pipe is always completely surrounded by the tubular section. The fastener is preferably provided with the hanger, the fastener being held by friction within the hanger. Thus, the present invention eliminates the need to provide and store a fastener separately before the hanger is to be used.

The present invention therefore has the primary object of providing a hanger for suspending a pipe, or its equivalent, from a support structure.

The invention has the further object of providing a hanger as described above, wherein only a single fastener is needed to lock the hanger around the pipe and to affix the hanger to the support stricture.

The invention has the further object of providing a hanger having a fastener which can be conveniently stored as part of the hanger.

The invention has the further object of providing a hanger for a pipe, the hanger having a convenient means for locking the hanger in position around the pipe.

The invention has the further object of providing a hanger having surfaces which make it easy to urge the two ends of the hanger towards each other.

The invention has the further object of providing a method of attaching a pipe to a support structure, using the hanger described above.

The invention has the further object of making it easier to attach a pipe or similar object to a support structure.

The invention has the further object of enabling one person to attach a pipe to a wall, a beam, or any other support structure, with minimal effort.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 6A provides a cross-sectional view, similar to that of FIG. 4B, showing a pre-loaded nail inserted into the hanger of the present invention.

FIG. 6B provides a view similar to that of FIG. 6A, showing an embodiment of the present invention in which there is no tubular projection to hold the nail.

FIG. 7 provides a side view of the hanger of the present invention, including a fragmentary view of the pre-loaded nail.

DETAILED DESCRIPTION OF THE INVENTION

Figure 3:
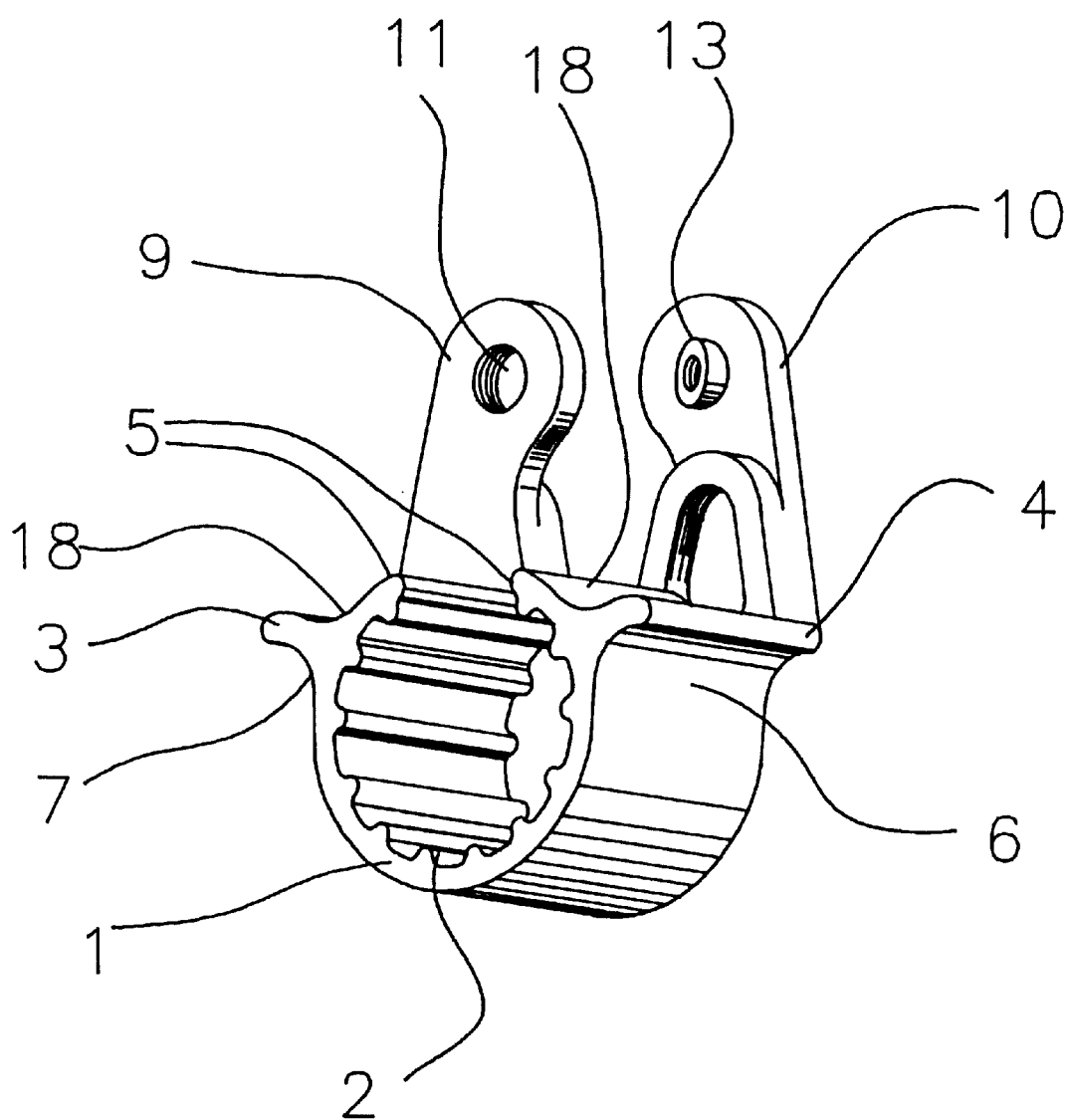
FIG. 3 provides a perspective view of the hanger of the present invention.

FIG. 3 provides a perspective view of the hanger of the present invention. The hanger is preferably formed of a flexible plastic material, and includes a generally tubular section 1 having a split 5 which defines two opposing ends of the tubular section, and which allows the hanger to be fitted around a pipe or tube. The inside of tubular section 1 may have axial splines 2 to facilitate gripping of the pipe and also to enhance the thermal isolation of the pipe.

Ribs 3 and 4 project from the tubular section 1. The ribs define curved surfaces which are continuous with the exterior surface of the tubular section. These curved surfaces, indicated generally by reference numerals 6 and 7, define finger rests which assist in closing the hanger around a pipe, especially when the hanger is used to suspend a pipe under a beam. The finger rests are formed both from the inward curvature of the exterior surface of tubular section 1, and from the outward curvature of the ribs.

The upper surfaces of the ribs, i.e. those surfaces which are opposite to the curved surfaces described above, are indicated by reference numeral 18. When the hanger is closed, these upper surfaces come together and form a flat surface, or a nearly flat surface, which not only isolates the pipe from the beam to which the hanger is attached, but also prevents rotation of the hanger about the fastener, relative to the beam.

Figure 4B:
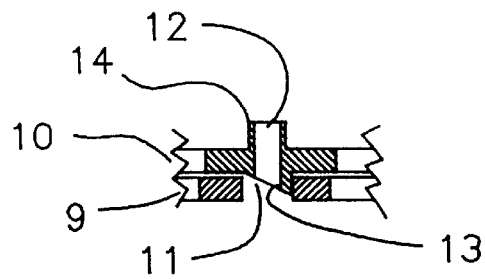
FIG. 4B provides a partial cross-sectional view, taken along the line 4B—4B of FIG. 4A.
Figure 4A:
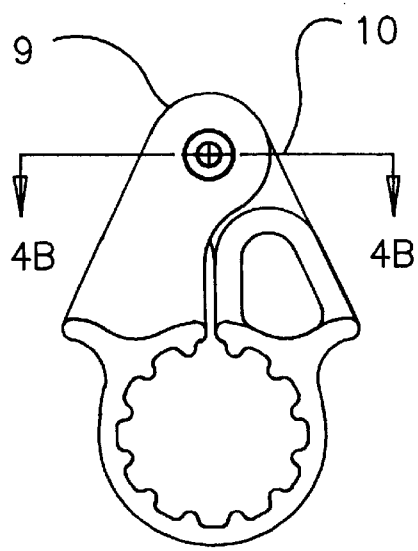
FIG. 4A provides a side elevational view of the hanger of the present invention, showing the hanger in the locked position.

The hanger also includes tabs 9 and 10 which extend from the tubular section 1. Tab 10 includes tubular projection 13. The tabs facilitate locking of the hanger around a pipe, as illustrated in FIGS. 4A and 4B. Hole 11 is formed in tab 9, and another hole 12 (not visible in FIG. 3) is formed in tab 10.

FIGS. 4A and 4B show the hanger in the locked position. For convenience of illustration, no pipe is shown. In the locked position, the holes in the tabs are aligned with each other, and the tubular projection 13 engages hole 11 in tab 9 to lock the hanger in the closed position. This locking effect is particularly apparent in the cross-sectional view of FIG. 4B. FIG. 4B shows the tubular projection 13 inserted into hole 11 of tab 9.

Figure 5B:
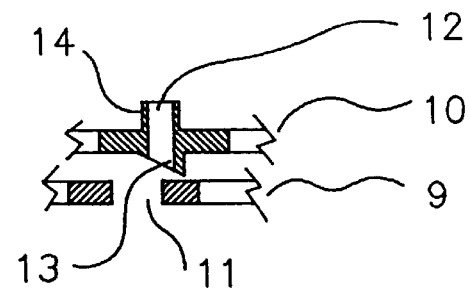
FIG. 5B provides a partial cross-sectional view, taken along the line 5B—5B of FIG. 5A.
Figure 5A:
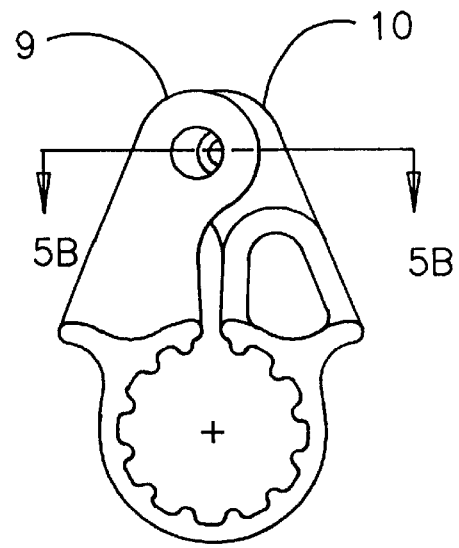
FIG. 5A provides a side elevational view of the hanger of the present invention showing the hanger in the unlocked position.

FIGS. 5A and 5B show the hanger in the unlocked position. As shown in FIG. 5A, the holes of the tabs are now out of alignment. FIG. 5B shows the tubular projection 13 disengaged from hole 11 of tab 9.

The tubular projection preferably has the shape of a beveled cylinder. It could also be described as a frustrum of a cylindrical tube. The diagonal portion of the tubular projection provides a cam surface on which tab 9 slides when the tabs are urged together, arid before the tubular projection becomes seated in the hole in tab 9.

As illustrated in FIG. 6A (and as also shown in FIGS. 4B and 5B), the side of tab 10 which is opposite that of the locking mechanism has a tubular chamber 14 which holds nail 19. Instead of a nail, one could use a screw or some other elongated fastener. The relatively thin-walled tube defining chamber 14 provides a light press fit for holding the fastener in place before the hanger is used. Also, when the fastener is driven into the beam or other support structure to secure the hanger thereto, the chamber walls are designed to flatten under the fastener head.

Alternatively, the portion of chamber 14 which projects from tab 10 can be omitted if the tab is thick enough to hold the fastener by itself, as illustrated in FIG. 6B. FIG. 7 provides a side view showing the hanger with the fastener 19.

Figure 8A:
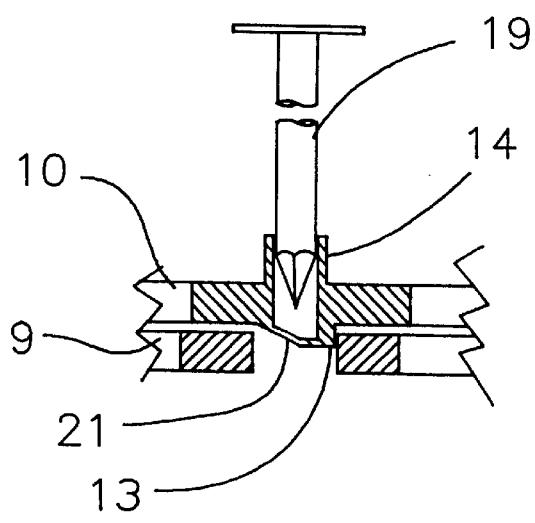
FIG. 8A provides a cross-sectional view, similar to that of FIG. 6A, showing an embodiment of the present invention in which the pre-loaded nail is inserted into a blind hole.
Figure 8B:
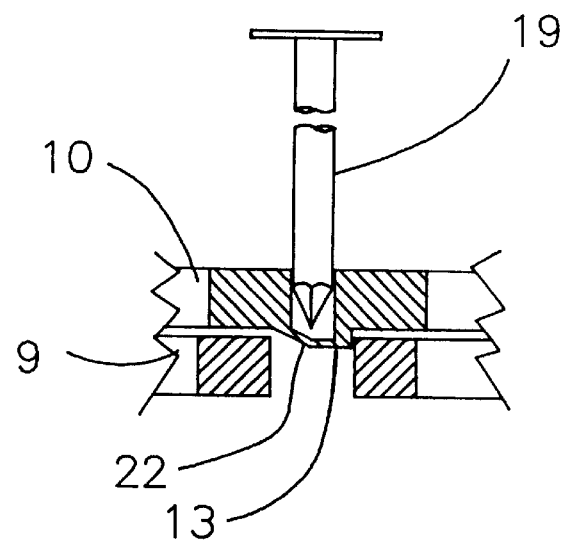
FIG. 8B provides a view similar to that of FIG. 8A, showing an embodiment of the present invention in which there is no tubular projection.

FIGS. 8A and 8B show alternative embodiments in which the fastener is inserted into a blind hole. In FIG. 8A, a residual piece of material 21 remains part of the tab 10. A similar piece of material 22 is found in the embodiment of FIG. 8B, in which the protruding portion of chamber 14 has been omitted, similar to the embodiment of FIG. 6B. In both of these arrangements, the nail 19 sits in a blind hole. When the fastener is driven into the support structure, it penetrates the material 21 or 22, and that material becomes compressed in the space surrounding the fastener.

Figure 9A:
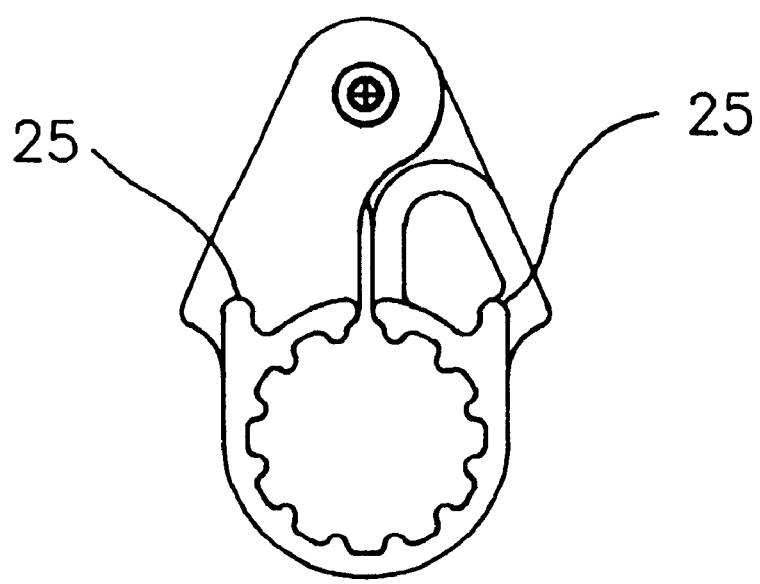
FIGS. 9A and 9B provide side elevational views of two alternative embodiments of the hanger of the present invention, these embodiments including means for stabilizing the hanger against an adjacent surface.
Figure 9B:
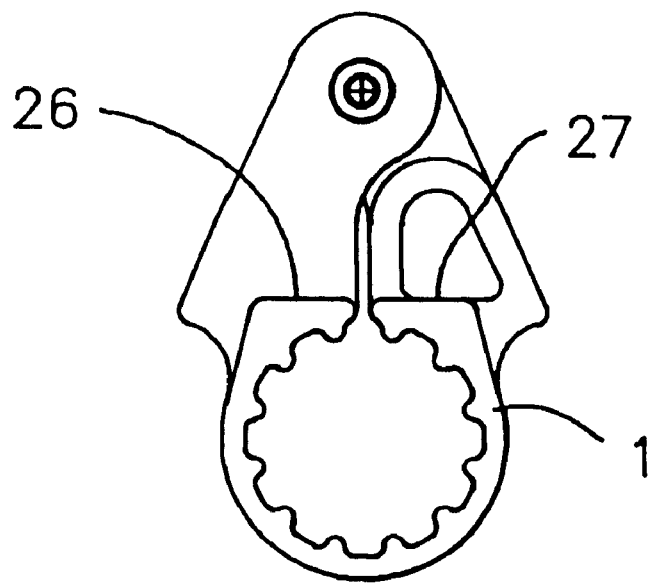

FIGS. 9A and 9B show alternative embodiments which prevent the hanger from rotating when it is mounted against a flat surface. In FIG. 9A, fingers 25 project from the tubular section 1. These fingers will engage the surface of a joist or beam (not shown in the figure), thus preventing rotation of the hanger. In FIG. 9B, the exterior portion of the tubular section 1 defines flat surfaces 26 and 27. When the hanger is in the closed position, these flat surfaces combine to) form a larger flat surface which abuts the surface of the joist or beam, and, like the preceding embodiment, also prevents rotation of the hanger relative to the joist or beam.

Figure 10:
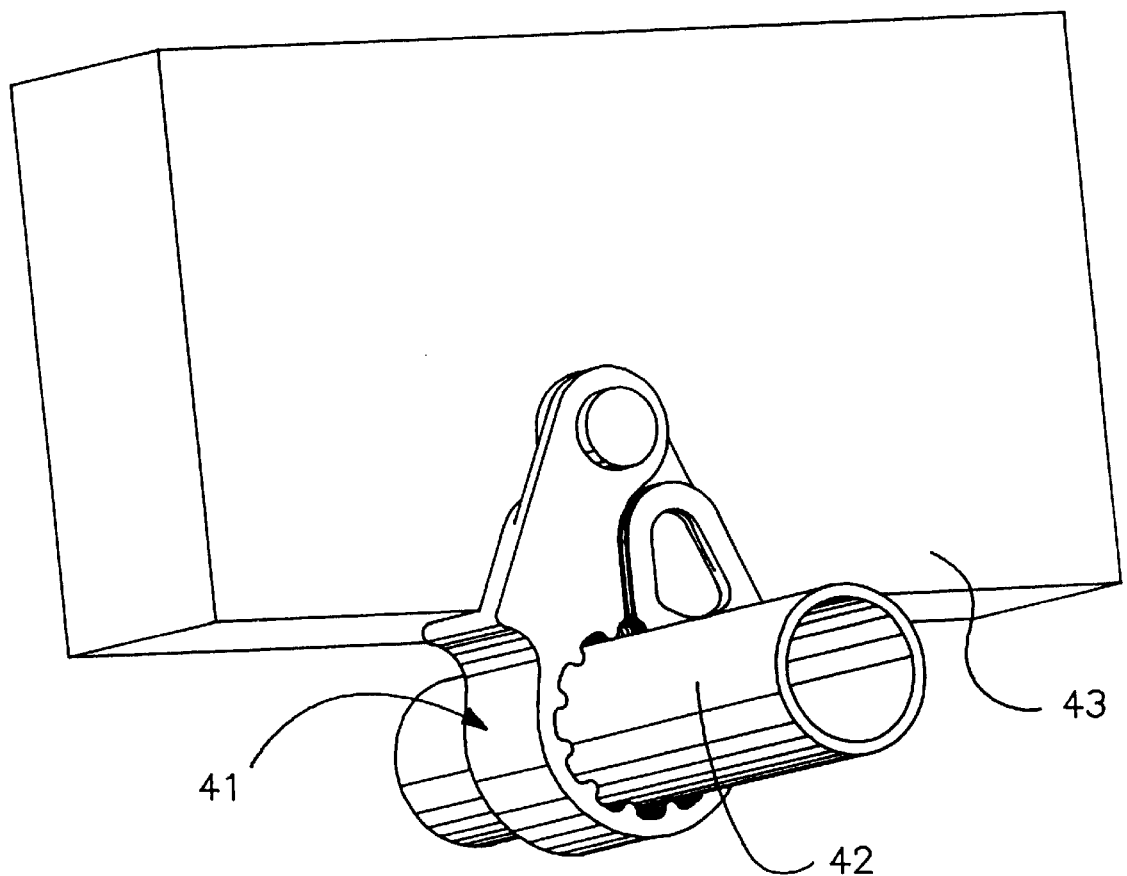
FIG. 10 provides a perspective view of the hanger of the present invention, as used in supporting a pipe from a beam.

FIG. 10 provides an example of the use of the hanger of the present invention. Hanger 41 supports pipe 42 from beam 43. The pipe is completely isolated from the beam, and the hanger is affixed to the beam at a single point of attachment.

Figure 1A:
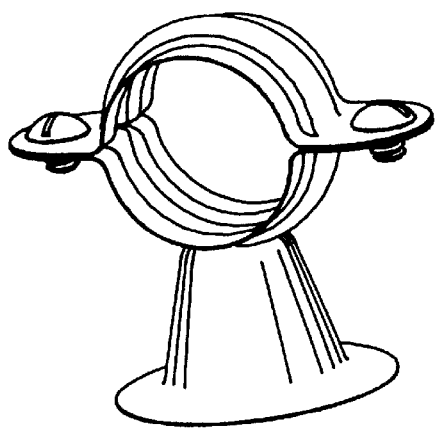
FIGS. 1A, 1B, and 1C provide perspective views of various hanging devices used to support metal pipes, in the prior art.
Figure 1B:
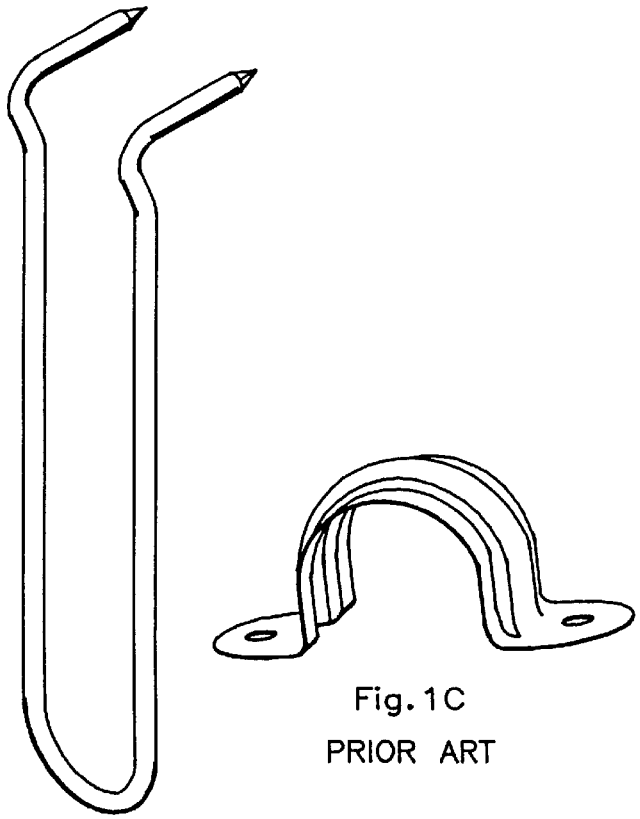
Figure 1C:
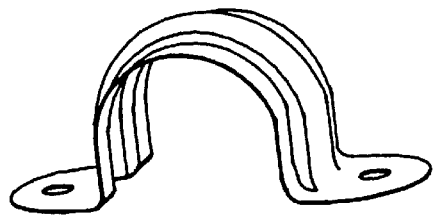
Figure 11:
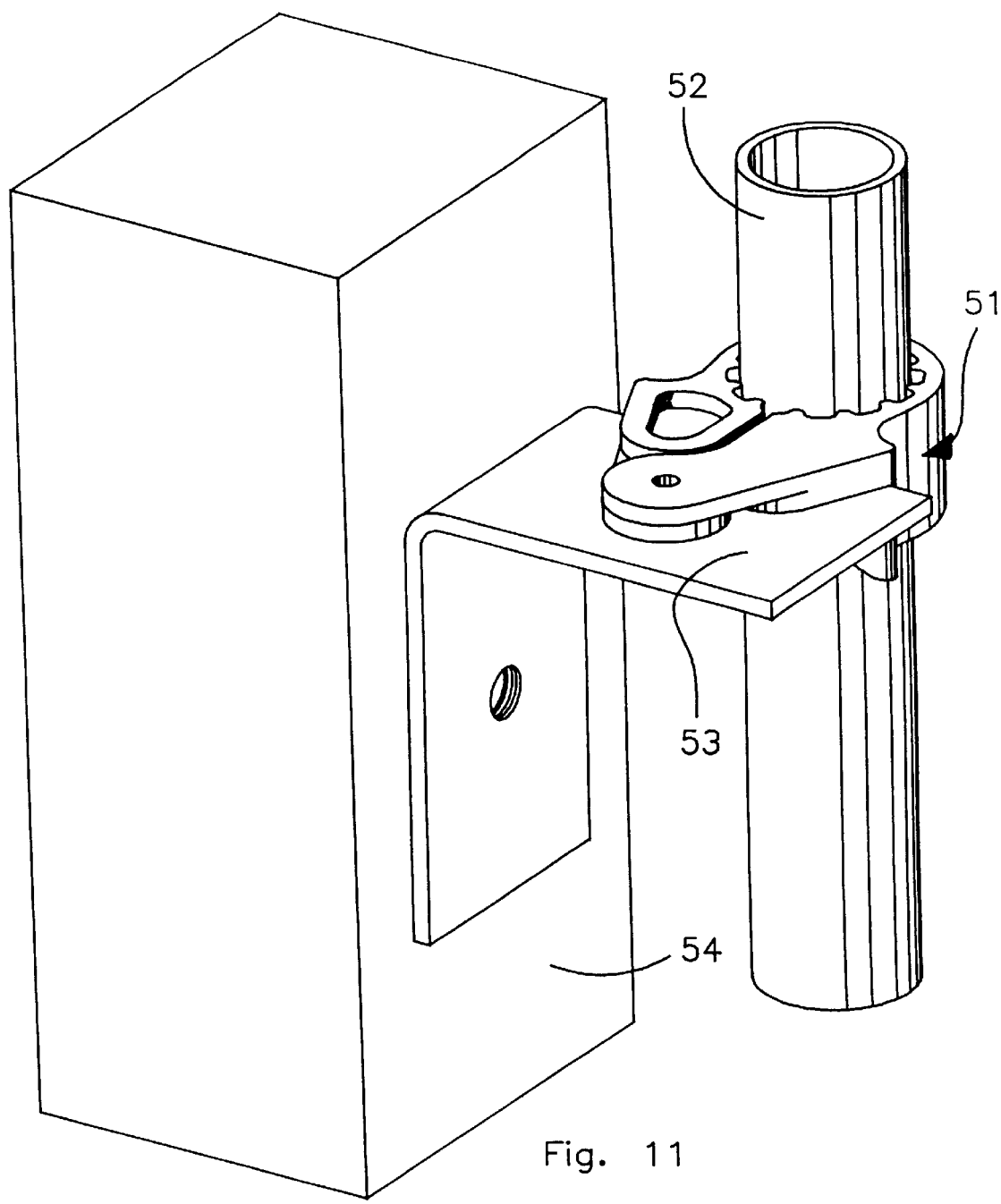
FIG. 11 provides a perspective view of the hanger of the present invention, as used to attach a pipe to an angle bracket.

FIG. 11 provides another example of the use of the present invention. Hanger 51 supports pipe 52 in a vertical position, and attaches to angle bracket 53 which is attached to support structure 54. In this way, the hanger of the present invention can emulate the bell hanger shown in FIG. 1A.

Figure 12:
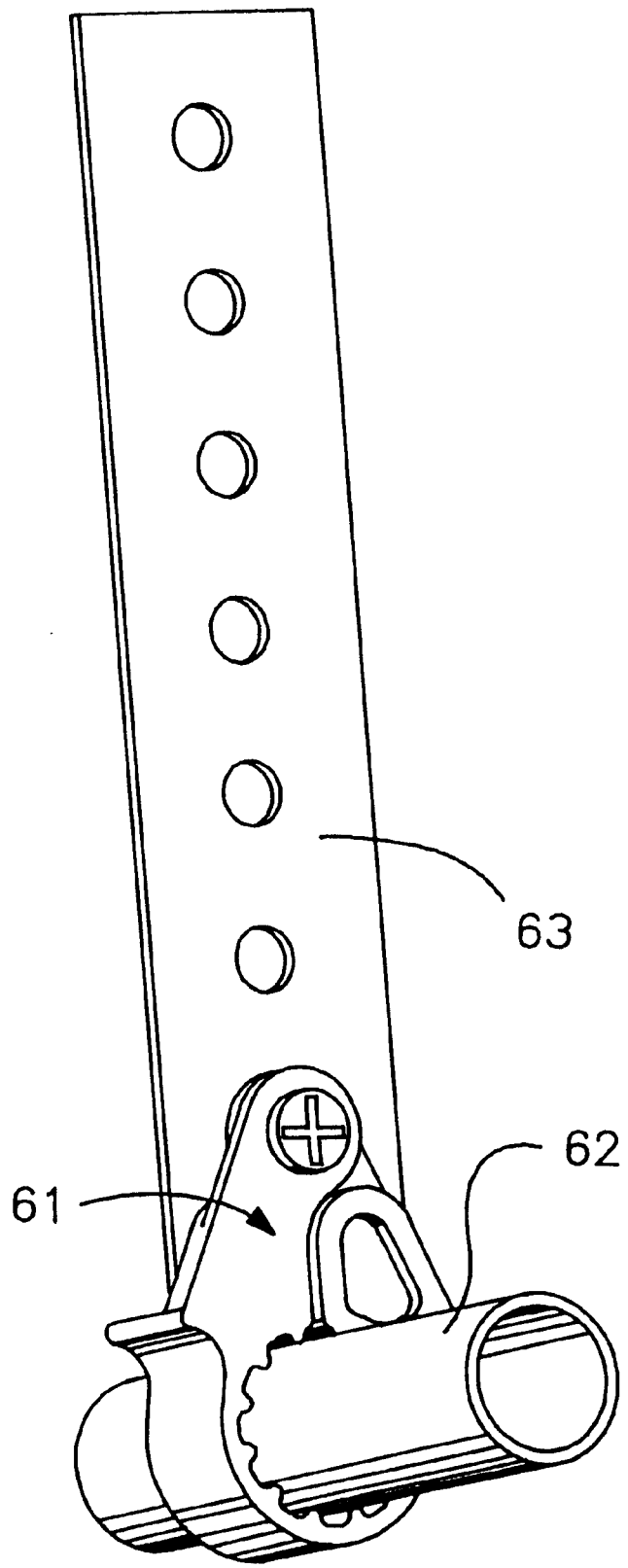
FIG. 12 provides a perspective view of the hanger of the present invention, as used to attach a pipe to an extension bar.

FIG. 12 shows yet another example of the use of the present invention. Hanger 61 supports pipe 62, the hanger being affixed to extension bar 63. The hanger 61 is affixed to the extension bar through one of the holes in the bar.

The hanger of the present invention can thus be used to attach a pipe to a support structure, both horizontally and vertically. In particular, the hanger of the invention can function as a riser clamp, supporting a vertical pipe disposed along a wall or stud. The hanger can also be used to support flexible tubing, or other tubing, as the tubing snakes through rafters or walls.

The hanger of the present invention therefore provides means for attaching a pipe, or similar object, to a support structure, wherein the attachment can easily be done by one person. Because the hanger requires only a single fastener, and because the fastener is provided with, and held by, the hanger itself, the hanger is especially convenient to use.

Figure 2A:
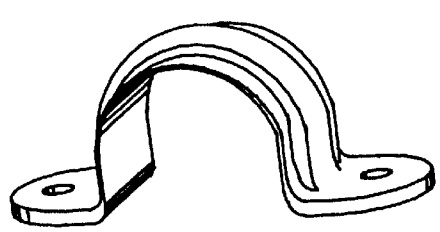
FIGS. 2A, 2B, and 2C provide perspective views of various hanging devices used to support plastic pipes, in the prior art.
Figure 2B:
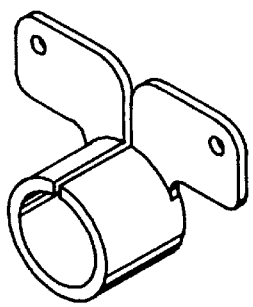
Figure 2C:
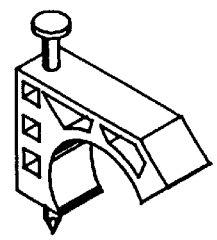

The use of a single fastener has another important advantage, namely the reduction of stress concentrations. In a suspension clamp of the prior art, as shown in FIG. 2B, concentrations of stress tend to develop near the ends of the main tubular section, due to the positions of the two nails or screws required to attach the clamp to the wall. Such stress concentrations can weaken the material, and can cause failure of the entire hanger. In the present invention, the use of a single fastener, at a point on the central axis of the hanger, prevents such stress concentrations from developing, resulting in a more reliable hanger.

The invention can be modified in various ways. The preferred material is plastic, but the hanger can be made of other materials instead. The shapes of the tabs, the ribs, and the curved surfaces can be modified. The tubular section can be made with or without splines. All of these modifications, and others which will be apparent to those skilled in the art, should be deemed within the spirit and scope of the following claims.

What is claimed is:

1. A pipe hanger comprising a generally tubular section, the tubular section being split to define two opposing ends, the tubular section being unbroken except in a vicinity of said two opposing ends, the tubular section having a longitudinal axis, wherein the ends can be spread apart to fit the tubular section around a pipe, the ends of the tubular section being attached to tabs which project from the ends, the tabs having holes which are positioned so that they can be brought into alignment when the tabs are moved towards each other, wherein the holes, when aligned, define a channel having a longitudinal axis which is substantially parallel to the longitudinal axis of the tubular section.

2. The pipe hanger of claim 1, further comprising a fastener inserted into one of said holes.

3. The pipe hanger of claim 2, wherein the hole into which the fastener is inserted is a blind hole.

4. The pipe hanger of claim 1, wherein the tubular section includes a pair of ribs, wherein the ribs define curved surfaces comprising finger rests.

5. The pipe hanger of claim 4, wherein the tubular section includes an exterior surface having an inward curvature, the exterior surface being continuous with the curved surfaces of the ribs.

6. The pipe hanger of claim 1, wherein one of the tabs has a tubular projection which extends toward the other of the tabs, the tubular projection having a size which permits insertion of the tubular projection into the hole of the other tab, wherein the tubular projection comprises means for locking the tabs together.

7. The pipe hanger of claim 6, wherein the tubular projection is beveled.

8. The pipe hanger of claim 6, wherein the tab having the tubular projection also has a tubular chamber, the tubular chamber being aligned with the tubular projection, the chamber extending outward and away from the other tab, the chamber comprising means for holding an elongated fastener.

9. The pipe hanger of claim 1, wherein one of the tabs has a tubular chamber extending outward and away from the other tab, the chamber comprising means for holding an elongated fastener.

10. The pipe hanger of claim 1, wherein the tubular section has at least two fingers projecting from the tubular section, wherein the fingers comprise means for preventing rotation of the hanger when the hanger has been affixed to a support structure.

11. The pipe hanger of claim 1, wherein the ends of the tubular section define generally flat surfaces, the flat surfaces comprising means for preventing rotation of the hanger when the hanger has been affixed to a support structure.

12. A pipe hanger comprising a tubular section having a longitudinal axis, the tubular section being split to define two opposing ends, said ends being connected respectively to first and second tabs, the tabs having holes which come into alignment when the tabs are urged together, wherein the holes, when aligned, define a channel having a longitudinal axis which is substantially parallel to the longitudinal axis of the tubular section, the tubular section including ribs having curved surfaces which define finger rests, and wherein one of the tabs includes a tubular projection positioned in a vicinity of the hole in the tab, the tubular projection being sized such that it can engage the hole in the other tab, so as to lock the tabs together.

13. The pipe hanger of claim 12, wherein the tubular section includes an exterior surface having an inward curvature, the exterior surface being continuous with the curved surfaces of the ribs.

14. The pipe hanger of claim 12, further comprising an elongated fastener inserted into one of the holes, the fastener being engaged by friction at least with material defining a tab.

15. The pipe hanger of claim 12, wherein the tab having the tubular projection also has a tubular chamber positioned on the opposite side of the tab relative to the tubular projection, the hanger further comprising an elongated fastener inserted into the tubular chamber, the fastener being engaged by friction with material defining said tubular chamber.

16. The pipe hanger of claim 15, wherein the tubular chamber is aligned with the hole in the tab having the tubular projection, and wherein the hole is a blind hole.

17. A method of attaching a pipe to a support structure, the method comprising the steps of:

a) fitting a hanger, having an axially-split tubular section defining two ends, around a pipe, the tubular section being unbroken except in a vicinity of said two ends, by opening the tubular section at a region of the ends and fitting the tubular section around the pipe, the ends of the tubular section being connected to tabs, the tubular section having a longitudinal axis, and the pipe having a longitudinal axis, the longitudinal axis of the tubular section being substantially parallel to the longitudinal axis of the pipe, b) urging the tabs together, so that holes in the tabs become aligned to define a channel which is substantially parallel to the longitudinal axes of the tubular section and the pipe, c) inserting a fastener through said channel defined by the holes and into a support structure, wherein the hanger is held in a locked position by a single fastener, and wherein the hanger is also affixed to the support structure by a single fastener.

18. The method of claim 17, wherein one of the tabs includes a tubular projection adapted to engage the hole in the other tab, and wherein step (b) comprises the step of sliding one tab over the other tab until the tubular projection becomes engaged in the hole in the other tab.

19. A pipe hanger comprising a generally tubular section, the tubular section being split to define two opposing ends, wherein the ends can be spread apart to fit the tubular section around a pipe, the ends of the tubular section being attached to tabs which project from the ends, the tabs having holes which are positioned so that they can be brought into alignment when the tabs are moved towards each other, further comprising a fastener inserted into one of said holes, wherein the hole into which the fastener is inserted is a blind hole.

20. A pipe hanger comprising a generally tubular section, the tubular section being split to define two opposing ends, wherein the ends can be spread apart to fit the tubular section around a pipe, the ends of the tubular section being attached to tabs which project from the ends, the tabs having holes which are positioned so that they can be brought into alignment when the tabs are moved towards each other, wherein one of the tabs has a tubular projection which extends toward the other of the tabs, the tubular projection having a size which permits insertion of the tubular projection into the hole of the other tab, wherein the tubular projection comprises means for locking the tabs together, wherein the tab having the tubular projection also has at tubular chamber, the tubular chamber being aligned with the tubular projection, the chamber extending outward and away from the other tab, the chamber comprising means for holding an elongated fastener.

21. A pipe hanger comprising a generally tubular section, the tubular section being split to define two opposing ends, wherein the ends can be spread apart to fit the tubular section around a pipe, the ends of the tubular section being attached to tabs which project from the ends, the tabs having holes which are positioned so that they can be brought into alignment when the tabs are moved towards each other, wherein one of the tabs has a tubular chamber extending outward and away from the other tab, the chamber comprising means for holding an elongated fastener.

22. A pipe hanger comprising a generally tubular section, the tubular section being split to define two opposing ends, wherein the ends can be spread apart to fit the tubular section around a pipe, the ends of the tubular section being attached to tabs which project from the ends, the tabs having holes which are positioned so that they can be brought into alignment when the tabs are moved towards each other, wherein the tubular section has at least two fingers projecting from the tubular section, wherein the fingers comprise means for preventing rotation of the hanger when the hanger has been affixed to a support structure.

23. A pipe hanger comprising a generally tubular section, the tubular section being split to define two opposing ends, wherein the ends can be spread apart to fit the tubular section around a pipe, the ends of the tubular section being attached to tabs which project from the ends, the tabs having holes which are positioned so that they can be brought into alignment when the tabs are moved towards each other, wherein the ends of the tubular section define generally flat surfaces, the flat surfaces comprising means for preventing rotation of the hanger when the hanger has been affixed to a support structure.

24. A pipe hanger comprising a tubular section which is split to define two opposing ends, said ends being connected respectively to first and second tabs, the tabs having holes which come into alignment when the tabs are urged together, the tubular section including ribs having curved surfaces which define finger rests, and wherein one of the tabs includes a tubular projection positioned in a vicinity of the hole in the tab, the tubular projection being sized such that it can engage the hole in the other tab, so as to lock the tabs together, further comprising an elongated fastener inserted into one of the holes, the fastener being engaged by friction at least with material defining a tab.

25. A pipe hanger comprising a tubular section which is split to define two opposing ends, said ends being connected respectively to first and second tabs, the tabs having holes which come into alignment when the tabs are urged together, the tubular section including ribs having curved surfaces which define finger rests, and wherein one of the tabs includes a tubular projection positioned in a vicinity of the hole in the tab, the tubular projection being sized such that it can engage the hole in the other tab, so as to lock the tabs together, wherein the tab having the tubular projection also has a tubular chamber positioned on the opposite side of the tab relative to the tubular projection, the hanger further comprising an elongated fastener inserted into the tubular chamber, the fastener being engaged by friction with material defining said tubular chamber.

26. The pipe hanger of claim 25, wherein the tubular chamber is aligned with the hole in the tab having the tubular projection, and wherein the hole is a blind hole.

27. A pipe hanger comprising a generally tubular section, the tubular section being split to define two opposing ends, the tubular section having a longitudinal axis, wherein the ends can be spread apart to fit the tubular section around a pipe, the ends of the tubular section being attached to tabs which project from the ends, the tabs having holes which are positioned so that they can be brought into alignment when the tabs are moved towards each other, wherein one of the tabs has a tubular projection which extends toward the other of the tabs, the tubular projection having a longitudinal axis which is substantially parallel to the longitudinal axis of the tubular section, the tubular projection having a size which permits insertion of the tubular projection into the hole of the other tab, wherein the tubular projection comprises means for locking the tabs together.

* * * * *